3,493,464
FUNGUS-RESISTANT PAPER CONTAINING METALLIC QUINOLINOLATE FORMED IN SITU AND PROCESS THEREOF
Alan R. Bowers and David T. Milne, Mosinee, Wis., assignors to Mosinee Paper Mills Company, Mosinee, Wis., a corporation of Wisconsin
No Drawing. Filed Aug. 21, 1968, Ser. No. 754,757
Int. Cl. D21h 5/22, 3/00; D21d 3/00
U.S. Cl. 162—161                                                  8 Claims

ABSTRACT OF THE DISCLOSURE

A fungus-resistant or moldproof paper containing a metallic quinolinolate as the fungicidal or fungistatic agent which has been precipitated in the pulp slurry by first adding a solution of a hydroxyquinoline to the pulp slurry and then adding a solution of a metal salt, to thereby precipitate the metallic quinolinolate prior to formation of a sheet from the pulp slurry or furnish.

BACKGROUND OF THE INVENTION

Field

This invention relates generally to fungus-resistant papers (by which is meant paper containing an active ingredient that will prevent or inhibit the growth of fungi) containing a metallic quinolinolate, preferably copper, zinc or aluminum 8-quinolinolate, as the active ingredient and, in particular, relates to a new mode of adding such ingredients to the paper and the paper sheet obtained thereby.

Description of the prior art

Copper 8-quinolinolate has long been known as an excellent fungus-resisting agent because of its effective fungicidal and fungistatic properties and low toxicity to human beings. The prior art teaches two methods for adding it to paper.

According to one prior art method, the powdered form of copper 8-quinolinolate has been added to the paper furnish or slurry fed to a papermaking machine. The copper 8-quinolinolate, however, is an insoluble powder, at least under papermaking conditions, and this method of addition has proved to be generally ineffective because the retention of the finely divided solid copper 8-quinolinolate in the paper sheet was relatively low.

Another known method of providing copper 8-quinolinolate in a paper sheet has been the size press application of a dispersion of the "solubilized form" of the compound. Solubilized copper 8-quinolinolate refers to the product formed by heating copper 8-quinolinolate with certain organic acids (naphthenic, lactic, stearic, etc.) or their salts. This method is usually more effective than the first, but cannot provide paper which has the long-term moldproofness so often needed in many end uses because the compound is relatively easy to remove by leaching with water. The high cost of the solubilized and powdered forms of copper 8-quinolinolate further limits their use in the field of moldproof papers.

SUMMARY

A metallic quinolinolate or quinolinolate salt is added to the paper of this invention by adding a solution of a hydroxyquinoline to the pulp furnish (i.e. the mixture containing the constituents of paper) in the pulper or beater, and next adding a solution of a metal salt. A metallic quinolinolate is thereby precipitated in situ in the furnish before it is fed to the papermaking machine.

We have discovered that paper having a metallic quinolinolate added in this fashion provides marked new advantages in comparison to papers containing the same compound but made according to the prior art methods described above. Our new paper when including copper 8-quinolinolate exhibits greater fungicidal activity than paper containing copper 8-quinolinolate added to the furnish in powdered form, both papers having the same concentration level of the compound.

The paper of our invention possesses greater resistance to deterioration when buried in soil in comparison to paper with copper 8-quinolinolate added as a powder to the furnish or paper containing solubilized copper 8-quinolinolate added at the size press, again comparing papers with the same concentration of the compound. This latter characteristic renders the paper of this invention particularly useful as a mulch paper wherein it is laid upon soil and soil covers its edges to hold it in place during a growing season; under these conditions, the paper of this invention retains its fungicidal properties and will not deteriorate for suitable growing periods, whereas papers according to the prior art soon lose their fungicidal characteristic and deteriorate so rapidly as to become unusable. While having particular utility as a mulch paper, the paper of this invention may also be used in other applications where a moldproof paper is required, such as wrapping soap or other materials subject to fungal growth.

The present paper can be formed as a flat, creped or machine glazed sheet, it can be bleached, unbleached or colored in any desired manner, it may be sized or unsized, and it may or may not contain a wet strength agent—all without impairment of its mold resistance properties. Neither of the prior art papers with the same type of active ingredient possesses all of these characteristics.

Among the principal objects of this invention are to provide a new form of paper containing metallic quinolinolates as the fungus-resistant ingredient; to provide paper with fungicidal or fungistatic quantities of a metallic quinolinolate which is more effective and less subject to deterioration than other papers with the same compound; to provide a fungus-resistant paper which will maintain its fungicidal or fungistatic activity over extended periods of time, such as throughout the growing season of certain crops, without deterioration; to provide new methods for the production of paper containing copper 8-quinolinolate; and to provide a fungus-resistant paper in which the fungicidal or fungistatic ingredient is highly resistant to being leached out with water.

DESCRIPTION OF PREFERRED EMBODIMENTS

The following examples describe, for the purpose of illustration and not limitation, several forms in which this invention may be practiced, and include comparisons with prior art papers using the same active ingredient. It is to be understood that it is intended to cover all changes and modifications of the disclosed examples and other embodiments, which do not constitute a departure from the true spirit and scope of this invention.

The term "parts" as used in the examples refers to parts by weight on the basis of 100 parts of ovendry fibers or pulp, unless otherwise noted. "Parts by weight of fibers" and "parts of fibers," or "pulp," as used herein, refers to parts by weight of ovendry fibers or pulp. "Basis weight" is the weight in pounds of 3,000 square feet of paper. All papers in each example were tested for fungus resistance in accordance with TAPPI (Technical Association of the Pulp and Paper Industry) Method T 487 m–54 using five test organisms: *Chaetomium globosum*, *Aspergillus niger*, *Aspergillus terreus*, *Aspergillus fumigatus*, and *Aspergillus species* (unidentified), unless otherwise noted.

The soil burial tests utilized in the examples are in accordance with the method of ASTM (American Society for Testing Materials) E154–64T, except that a soil bed eighteen inches deep and four feet square was used. Briefly, the soil bed was maintained at a temperature of 83° F. (plus or minus 2°), and a relative humidity of 73% to 75%. Test samples of the paper were inserted in plastic frames and buried in the soil bed for the times specified in the examples. The term "deterioration" used in the examples to characterize results of the soil burial tests means the disintegration or rotting away of the paper due to the action of soil fungi and soil bacteria. When the paper is to be used as a mulch paper, it is essential that it not deteriorate throughout the growing season for the particular crop with which it is used; hence, resistance to soil deterioration for useful periods of time is a necessary characteristic of a suitable mulch paper.

The same mixing procedure was used in all of the following examples, except Example 22. The hydroxyquinoline was first dissolved in an acid or alkaline solution and added to a well-agitated aqueous slurry of the fibers in either the pulper or beater. The mixture was agitated so that the hydroxyquinoline became well soaked into the fibers; suitable results are obtained with contact times of about 2 minutes to 2 hours depending on the nature of the mixing in the beater or pulper and the quantity of pulp, with a contact time of about 10 minutes used in most of the examples. Thereafter, a metal salt solution was added to the slurry to precipitate a metallic quinolinolate in and among the fibers, after which other ingredients, such as size, retention aid, wet strength resin, etc. were added to the slurry or furnish. The furnish was formed into paper on a conventional Fourdrinier papermaking machine, although this invention may also be employed with cylinder papermaking machines.

Example 1.—To an aqueous slurry containing 100 parts of softwood kraft fibers, natural unhydrated stock, were added 0.8 part 8-hydroxyquinoline, 0.2 parts sodium hydroxide, and 0.72 part copper sulfate pentahydrate. The 8-hydroxyquinoline was first dissolved in the sodium hydroxide outside the pulper, with good agitation, and then added to the slurry. The copper sulfate was also dissolved outside the pulper, and added to the slurry about 10 minutes after addition of the 8-hydroxyquinoline and sodium hydroxide. Further additions were 1.0 part rosin size, 1.0 part urea-formaldehyde wet strength resin, 1.5 part carbon black, 2.0 parts alum to pH 5.0 and 0.02 part of a high molecular-weight acrylamide polymer. This furnish was formed into a sheet, machine-creped, and dried.

The paper after normal drying contained 0.82 part copper 8-quinolinolate for every 100 parts by weight of fibers, had a basis weight of 49.5 pounds, a caliper of 10.6 mils, and a machine direction stretch of 5.6%.

The above paper was tested for fungus resistance in accordance with the method described above and, after two weeks incubation, specimens were completely free of fungus growth. Control samples made from a slurry of the same composition but without the 8-hydroxyquinoline, sodium hydroxide and copper sulfate had prolific fungus growth over the entire specimens when subjected to the same test.

Soil burial tests on the above treated paper showed that the untreated control samples were completely deteriorated at the end of one week, while the sheets containing copper 8-quinolinolate did not show evidence of any deterioration after four weeks burial.

Example 2.—A solution of 8-hydroxyquinoline and acetic acid was added to an aqueous fiber slurry to form a mixture containing 100 parts of unbleached softwood kraft fibers, 0.75 part of 8-hydroxyquinoline and 1.87 part acetic acid. Shortly thereafter, a copper sulfate solution was added so that the slurry contained 0.675 part copper sulfate pentahydrate. Other additions were 1.5 parts carbon black, 1.0 part rosin size, and 1.0 part urea formaldehyde wet strength resin. This furnish was formed into a paper sheet and dried.

After normal drying the paper contained 0.53 part copper 8-quinolinolate for every 100 parts of fibers, and had a basis weight of 42.0 pounds and a caliper of 5.1 mils. When tested for fungus resistance according to the above procedure, the paper completely inhibited growth of the test organisms for a two week incubation period.

Soil burial tests were also conducted on this paper with no evidence of deterioration after three weeks whereas control samples from the same furnish but without the copper 8-quinolinolate were completely deteriorated.

Example 3.—To an aqueous slurry comprising 80 parts full-bleached softwood kraft fibers and 20 parts bleached hardwood kraft fibers were added, after dissolving outside the pulper, 0.3 part 8-hydroxyquinoline, 0.07 part sodium hydroxide and 0.27 part copper sulfate pentahydrate. The 8-hydroxyquinoline was dissolved with the sodium hydroxide before addition to the slurry, and the copper sulfate was added about 10 minutes after the addition of the 8-hydroxyquinoline and sodium hydroxide. Other additions were 5 parts china clay, 1.0 part modified rosin sizing, 0.3 part urea-formaldehyde wet strength resin, 2.0 parts alum to pH 4.5 and 0.75 part of a high molecular weight cationic polyamine bisulfate salt.

This furnish was formed into a dried sheet on a Fourdrinier paper machine with a Yankee dryer. After normal drying, the paper contained 0.17 part copper 8-quinolinolate for every 100 parts of fibers, and had a basis weight of 21.9 pounds and a caliper of 1.75 mils. The machine-glazed sheet had a Sheffield smoothness of 60.

Samples were leached for 24 hours in standing tap water and were then tested for fungus resistance as in Example 1. The leached samples completely inhibited the growth of the test organisms for the two week incubation period, but control sheets without the copper 8-quinolinolate showed prolific fungus growth.

Paper of the basis weight and having the copper 8-quinolinolate quantity of this example provides a fungus-resistant paper suitable for soap wrap.

Example 4.—This example demonstrates advantages of the in situ precipitation of copper 8-quinolinolate in the fiber slurry or furnish over the prior art size press addition of solubilized copper 8-quinolinolate.

Using the procedure of Example 1, a furnish was made up comprising 100 parts of unbleached softwood kraft fiber, 0.3 part 8-hydroxyquinoline, 0.07 part sodium hydroxide and 0.27 part copper sulfate pentahydrate; 0.5 part of a neutral curing polyamide-type wet strength resin was also added. Paper sheets made from this furnish, after normal drying, contained 0.15 part copper 8-quinolinolate for every 100 parts of fibers.

The same furnish except for the 8-hydroxyquinoline, sodium hydroxide and copper sulfate was formed into a paper sheet and the solubilized form of copper 8-quinolinolate added to it at a size press, according to a prior art method, so that the dried sheets also contained 0.15 parts copper 8-quinolinolate for every 100 parts of fibers.

Both papers were subjected to the soil burial test, with each paper being tested both before and after leaching for 24 hours in standing tap water. At the end of three weeks, the paper samples were removed from the soil test bed; the paper of this invention (whether leached or not leached) wherein copper 8-quinolinolate was precipitated in situ in the furnish showed no evidence of deterioration, whereas the prior art paper (whether leached or not leached) to which solubilized copper 8-quinolinolate was added at the size press was badly deteriorated and no longer usable as paper sheets.

Example 5.—This example illustrates the increased effectiveness of copper 8-quinolinolate formed in situ in the fiber slurry or furnish as compared to the addition of the powder form of copper 8-quinolinolate to the furnish, at the same level of treatment.

Again using the mixing procedure of Example 1, an aqueous slurry was formed containing 100 parts of unbleached softwood kraft fibers, 0.5 part 8-hydroxyquinoline, 1.87 parts acetic acid, 0.45 part copper sulfate pentahydrate, 1.5 parts carbon black, 1.0 part rosin size, and 1.0 part urea-formaldehyde wet strength resin. The slurry was formed into a sheet and dried. The paper after normal drying contained 0.20 part copper 8-quinolinolate for every 100 parts of fibers, and is identified below as Set I.

To an aqueous slurry containing 100 parts of the same unbleached softwood kraft fiber were added 0.5 part of copper 8-quinolinolate in powder form, 1.5 parts carbon black, 1.0 part rosin size, and 1.0 part urea-formaldehyde wet strength resin. The furnish was formed into a sheet and dried. The paper after normal drying contained 0.19 part copper 8-quinolinolate for every 100 parts of fibers, and is identified below as Set II.

Both of these papers were tested for fungus resistance in accordance with the test described above. The paper of Set I was found to be completely fungus-resistant, while the paper of Set II permitted the light growth of the test organisms on one half of the test specimens.

Soil burial tests on these two papers were also conducted. Set I did not show any evidence of deterioration after 3 weeks burial, whereas Set II had more than 35% deterioration.

Mulch papers according to this invention can be made in dark or light colors, with the darker shades giving increased soil temperature, which results in faster seed germination and plant growth. Also, the field life of the paper can be controlled by adjusting the quantity of metallic quinolinolate precipitated in the paper, larger amounts being used for mulch papers applied with crops having longer growing seasons. Example 6 illustrates a dark mulch paper of long life, Example 7 shows a short life dark paper, and Examples 8 and 9 respectively illustrate long and short life light mulch paper.

Example 6.—A solution of 0.98 part of 8-hydroxyquinoline dissolved with 0.25 part of sodium hydroxide in 98.85 parts of water was added to an aqueous slurry comprising 100 parts of natural kraft softwood fibers and approximately 3,300 parts of water in a pulper. After thorough mixing in the pulper for ten minutes, a solution of 0.88 part of copper sulfate pentahydrate in 99.12 parts of water was added to the pulper to form 1.19 parts by weight of copper 8-quinolinolate in the slurry.

After thorough mixing to insure complete precipitation of the copper 8-quinolinolate, 1.875 parts of carbon black and 3.5 parts of papermaker's alum were added and mixed thoroughly with the fibrous slurry. The slurry was hydrated to a Canadian Standard Freeness of 450 to 525 cc. by passing through conventional Jordan engines.

Rosin sizing was added continuously to the hydrated slurry at a rate of 1.2 parts for 100 parts by weight of kraft fibers and urea-formaldehyde wet strength resin was added continuously at the rate of 1.0 part of resin for every 100 parts by weight of kraft fibers. After dilution to a consistency of 0.3 to 0.6 part of fibers to 100 parts of water a high molecular weight polyacrylamide retention aid was added at the rate of 0.025 part by weight to 100 parts by weight of kraft fibers. The furnish was formed into a paper sheet on a Fourdrinier paper machine. After pressing and partial drying, the sheet was creped in conventional manner and dried to a moisture content of from 3% to 6%.

The sheet, so formed, was black in color, had a basis weight of 50.4 pounds, and was 0.0105 in. thick. Its machine direction breaking stretch was from 3% to 5%. The sheet contained from 0.96 to 1.05 parts of copper 8-quinolinolate for every 100 parts of fibers.

The light transmittance of this paper in direct sunlight was less than 5 foot candles. This is more than adequate to suppress all weed growth. The black color serves to warm the soil over which the paper is laid, with resulting faster seed germination and plant growth.

The sheet was tested for resistance to fungal attack according to the above procedure, and, at the end of the two week test period, was found to be completely free from growth of the five test organisms. Paper from the same furnish but without copper 8-quinolinolate was subjected to the same tests, and exhibited heavy growth of all organisms at the end of one week and at the end of two weeks.

The paper also was subjected to the soil burial test, and there was no visible deterioration of the sheets at the end of 1, 2, 3 and 4 weeks. The tensile strengths of the sheets were determined and found to be as follows:

| Burial time | Lb./in. width | |
|---|---|---|
| | CD | MD |
| Unexposed | 11.3 | 14.7 |
| One week | 11.1 | 14.8 |
| Two weeks | 11.9 | 14.1 |
| Three weeks | 11.5 | 13.9 |
| Four weeks | 10.4 | 13.4 |

Untreated paper (i.e. from the same furnish but without the precipitated copper 8-quinolinolate) of the same basis weight was subjected to the same soil burial test at the same time, and was found to have decomposed completely at the end of one week.

The paper of this example withstood mechanical laying, perforation, and seeding operations when applied in a field. The paper remained in the field in the Mississippi Delta and suppressed weed growth until harvesting of the crop, which took place from 90 to 120 days after planting. After harvesting the crop, it was possible to disk the paper into the soil during preparation for the next crop.

Example 7.—The procedure of Example 6 was repeated, except that 0.33 part of 8-hydroxyquinoline was dissolved with 0.08 part of sodium hydroxide and added to the pulper, followed with 0.29 part of copper sulfate pentahydrate to precipitate 0.40 part of copper 8-quinolinolate. The sheet formed from this furnish contained from 0.26 to 0.37 part of copper 8-quinolinolate for every 100 parts of fibers.

This sheet had essentially the same light transmittance and passed the same fungus resistance and soil burial tests as the sheet made according to Example 6. Tensile strength data were:

| Burial time | Lb./in. width | |
|---|---|---|
| | CD | MD |
| Unexposed | 11.0 | 16.9 |
| One week | 10.0 | 17.3 |
| Two weeks | 9.9 | 15.6 |
| Three weeks | 10.4 | 16.5 |
| Four weeks | 11.3 | 20.8 |

At the end of 30 to 40 days from planting in the Mississippi Delta, the paper was found to be sufficiently strong to prevent weed growth, but did not interfere with mechanical harvesting and could be disked into the soil during preparation for the next crop.

Example 8.—The procedure of Example 6 was repeated except that, after formation of copper 8-quinolinolate, 0.15 part by weight of carbon black and 5.0 parts by weight of clay were added for control of the light transmittance and reflectance of the final sheet. The resulting paper was gray in color, had a basis weight of 64.8 pounds, and was .0154 in. thick. The machine direction breaking stretch was 5.2% to 6.0%. The paper contained from 0.98 to 1.11 parts of copper 8-quinolinolate for every 100 parts of fibers.

The light transmittance of this gray paper in bright sunlight was between 16 and 40 foot candles. This shaded the soil sufficiently to prevent weed growth and, at the same time, reflected sufficient light to keep the soil from overheating. This paper passed the same fungus resistance and soil burial tests as those prepared according to Examples 6 and 7, while paper from the same fiber slurry, but without copper 8-quinolinolate, failed both tests. Results of soil burial tensile tests were:

| Burial time | Lb./in. width | |
|---|---|---|
| | CD | MD |
| Unexposed | 10.8 | 18.8 |
| One week | 11.8 | 19.1 |
| Two weeks | 11.8 | 18.2 |
| Three weeks | 12.0 | 18.2 |
| Four weeks | 11.5 | 18.2 |

The paper functioned as a mulch in a manner similar to that made as in Example 6, except that, because of its light color, it reflected light and kept the soil under it cool, rather than increasing the soil temperature as did the black paper of Example 6.

Example 9.—The procedure of Example 8 was repeated except that 0.33 part of 8-hydroxyquinoline were dissolved with 0.08 part of sodium hydroxide and precipitated with 0.29 part of copper sulfate pentahydrate to form 0.40 part of copper 8-quinolinolate in the furnish. The resulting paper was gray in color, had a basis weight of 63.6 pounds and was 0.0154 in. thick. Its machine direction stretch was 5.0% to 8.2%. The paper contained from 0.25 to 0.32 part of copper 8-quinolinolate for every 100 parts of fibers. The light transmittance of the gray paper was essentially the same as that of the paper of Example 8.

The paper passed the same fungus resistance test as the sheets made according to Examples 6, 7 and 8. Tensile test data for specimens subjected to the soil burial test were:

| Burial time | Lb./in. width | |
|---|---|---|
| | CD | MD |
| Unexposed | 12.1 | 20.6 |
| One week | 11.8 | 20.8 |
| Two weeks | 11.5 | 20.4 |
| Three weeks | 11.3 | 20.8 |
| Four weeks | 11.6 | 19.6 |

The laying characteristics and field life of this paper were essentially the same as for paper prepared as in Example 7.

Metallic quinolinolates other than copper 8-quinolinolate used in the preceding examples are useful in the practice of this invention, and Examples 10–17 illustrate some of the alternate compounds. Mixtures of two or more metallic quinolinolates are also useful, as shown in Examples 15, 16 and 17.

Example 10.—To an aqueous slurry containing 100 parts of full-bleached softwood kraft fibers, there was added a solution comprising 0.3 part 8-hydroxyquinoline and 0.07 part sodium hydroxide. Thereafter, 0.2 part of zinc sulfate monohydrate were dissolved in water and added to the slurry to form 0.37 part of zinc 8-quinolinolate therein. Other additions were 5 parts china clay, 1.0 part modified rosin sizing, 0.3 part urea-formaldehyde wet strength resin, and 2.0 parts alum to pH 4.5. The slurry or furnish was formed into a sheet, pressed, and dried.

The resulting paper was pale yellow in color and had excellent fungus resistance when tested according to the above-described fungus resistance test procedure with three organisms: *Aspergillus niger, Chaetomium globosum,* and *Aspergillus terreus.* Untreated paper from the same furnish, but without zinc 8-quinolinolate, tested at the same time supported heavy growth of all three organisms.

Example 11.—The procedure of Example 10 was repeated except that, in place of zinc sulfate, 0.42 part of nickel ammonium sulfate were added with the formation of 0.36 part by weight of nickel 8-quinolinolate in the slurry. The resulting sheet had a bluish-green cast and passed the same fungus resistance tests as the paper of Example 10.

Example 12.—A solution of 0.5 part of 8-hydroxyquinoline, dissolved with 0.07 part sodium hydroxide, was added to an aqueous slurry containing 100 parts of softwood natural kraft fibers. Into this slurry was mixed an aqueous solution of 0.39 part of ferric sulfate $(Fe_2(SO_4)_3 \cdot 9H_2O)$, to precipitate 0.56 part of ferric 8-quinolinolate therein. With mixing, one part of rosin sizing was added, followed by 2.7 parts of papermaker's alum to bring the pH of the slurry to 5. One part of urea formaldehyde wet strength resin was mixed in and a sheet was formed and dried in the conventional manner.

The dried sheet had a basis weight of 50 pounds and had the color of paper made from the unbleached kraft wood fibers. The paper passed the same fungus resistance tests as the paper of Example 10.

Example 13.—The procedure of Example 12 was repeated, except that 0.51 part of cobalt sulfate heptahydrate were added instead of the iron sulfate nonahydrate, to precipitate 0.6 part of cobalt 8-quinolinolate in the slurry.

The resulting sheet had the color of natural paper and passed the same fungus resistance tests as paper made as in Example 10.

Example 14.—To an aqueous slurry, containing 100 parts of bleached softwood kraft fibers, were added a solution containing 0.1 part 8-hydroxyquinoline and 0.3 part sodium hydroxide. Also added were 5 parts china clay, 1.0 part modified rosin sizing, 0.3 part urea-formaldehyde wet strength resin, and 3.0 part alum to pH 5.0 to form 0.106 part of aluminum 8-quinolinolate in the slurry. Then 0.005 part of Halapont Fast Blue dye were added. This slurry was formed into a paper sheet, pressed, and dried.

The paper was very white in appearance and had a G.E. brightness value of 78. The sheet was found to be fungus resistant when tested in accordance with the above-described test using all five test organisms.

The aluminum 8-quinolinolate, in combination with a very small amount of blue dye, results in a treatment for machine-glazed soap wrap paper that is fungus resistant and has an excellent white appearance.

Example 15.—The procedure of Example 6 was repeated, except that in place of copper sulfate, a water solution of 0.02 part of cobalt sulfate heptahydrate was incorporated slowly and with thorough mixing into the fiber slurry, with the precipitation of 0.022 part of cobalt 8-quinolinolate in the slurry. This was followed by the admixture of 0.84 part of copper sulfate pentahydrate, to form 1.17 parts of copper 8-quinolinolate in the slurry.

The sheet formed passed the same fungus resistance tests as paper made according to Example 6. This paper is useful as a mulch in geographic locations in which soil is deficient in cobalt.

Example 16.—The procedure of Example 15 was repeated except that 0.01 part of cobalt sulfate heptahydrate were added to form 0.01 part of cobalt 8-quinolinolate in the slurry. This was followed by 0.02 part of manganese sulfate tetrahydrate to form 0.03 part of manganese 8-quinolinolate in the slurry. Finally, 0.84 part of copper sulfate pentahydrate were added to form 1.17 parts of copper 8-quinolinolate in the slurry.

This paper had the same color and passed the same fungus resistance tests as paper made as in Examples 6 and 15. The paper was useful as a mulch in areas in which soil is deficient in cobalt and manganese.

Example 17.—The procedure of Example 1 was repeated, except that in place of 0.8 part of 8-hydroxyquinoline and the corresponding quantities of sodium hydroxide and copper sulfate pentahydrate added to form copper 8-quinolinolate, there were added to the fiber slurry 0.26 part of 2-hydroxyquinoline and 0.89 part of 8-hydroxyquinoline, dissolved with 0.30 part of sodium hydroxide. After mixing, a solution of 1.03 parts of copper sulfate pentahydrate was added to form 0.31 part of copper 2-quinolinolate and 1.08 parts of copper 8-quinolinolate in the slurry.

The dried paper was tested for fungus resistance as described in Example 1 and was found to be free of fungus growth at the end of the test period. The paper was also subjected to the soil burial test as described in Example 1 and found to be free of evidence of any deterioration at the end of the test period.

The papers of this invention may be coated with various functional coatings or laminated to other film materials. Particularly effective coated papers are shown in Examples 18, 19 and 20, and a useful laminate is shown in Example 21.

Example 18.—Paper manufactured as in Example 8 was treated with paraffin on the smooth side of the creped sheet using a conventional wet waxer. The wax coating contained 0.1 pound of 8-hydroxyquinoline dissolved in each 100 lbs. of the paraffin used. Twenty pounds of wax was used for every 65 lbs. or 3,000 sq. ft. of paper.

The resulting sheet was extremely water-resistant and suitable for use in the tropics. The fungus resistance of the waxed sheet was equal or better than that of the unwaxed paper.

Example 19.—The procedure of Example 18 was repeated except that, in place of 8-hydroxyquinoline dissolved in the paraffin, 0.1 pound of preformed and powdered copper 8-quinolinolate was dispersed in every 100 lbs. of the paraffin used for waxing the mulch paper.

The water-resistance and fungus resistance of this paper was the same as that made as in Example 18.

Example 20.—The paper of Example 8 was coated on the smooth side of the crepe with a composition comprising 21.3 parts of aluminum powder and 8.5 parts of acrylic polymer emulsified with 70.2 parts of water. This operation was performed with a conventional air knife coater and was followed by drying in a tunnel dryer.

The resulting aluminum coated mulch paper retained the fungus resistant properties of the uncoated mulch paper and, in addition, is effective in repelling aphids.

Example 21.—Mulch paper, manufactured as in Example 8, was laminated on conventional equipment to 1 mil aluminum foil with an acrylic latex adhesive. This laminate retained all of the fungus resistant properties of the mulch paper and, in addition, when used as a mulch for plants, repelled aphids by reason of the aluminum layer.

Salts of 8-hydroxyquinoline may also be used for the present papers, as illustrated in the next example.

Example 22.—The procedure of Example 6 was repeated, except that in place of 8-hydroxyquinoline dissolved with sodium hydroxide, a solution of 1.30 parts of 8-hydroxyquinoline sulfate dissolved in 30 parts of water was added to the fiber slurry. Other proportions and operations of the sheet manufactured remained the same as in Example 6, and the resultant paper had the same properties as determined by the fungus resistance test and the soil burial test.

There has thus been described a fungus resistant paper utilizing a metallic quinolinolate as the active ingredient which is formed in the slurry or furnish from which the paper is made by first adding a hydroxyquinoline in an acid or alkaline solution, or a soluble hydroxyquinoline compound in a water solution, and then adding a solution of a metal that will precipitate the metallic quinolinolate in situ in and among the fibers of the slurry or furnish, which is then fed to the papermaking machine. While the invention has been described in part by reference to a number of specific examples, materials other than those mentioned in the examples may be employed. Thus, in place of part or all of the 8-hydroxyquinoline as described in the examples, appropriate amounts of other quinoline derivatives may be used, such as: 2-hydroxyquinoline, dibromo-8-hydroxyquinoline, or dichloro-8-hydroxyquinoline, or salts thereof as listed below. In general, the other quinoline derivatives form appreciably less effective fungus inhibitors than the chelates of 8-hydroxyquinoline. Other water soluble hydroxyquinoline salts in addition to the sulfate of Example 21 may be used, such as the benzoate, citrate, tannate, adipate, succinate, salicylate, etc. salts of the preceding hydroxyquinolines. The water soluble salts may be used in water in place of either the acids or alkalies illustrated in the preceding examples. In general, the use of such water soluble salts is simpler than preparing solutions as in the above examples, but is more expensive. Acids and alkalies other than the acetic acid of some of the preceding examples and sodium hydroxide in others may be employed for preparing solutions of the hydroxyquinolines. Alternate acids include equivalent amounts of formic acid, propionic acid, butyric acid, oxalic acid, lactic acid, citric acid, hydrochloric acid, sulfuric acid and phosphoric acid. Suitable alkalies include lithium hydroxide, potassium hydroxide and ammonium hydroxide, with sodium hydroxide preferred because of its low cost and availability.

Instead of the copper, zinc, and aluminum salts described in the preceding examples, there may be used any water soluble salt of the following metals: beryllium, bismuth, cadmium, cobalt, gallium, hafnium, indium, iron, magnesium, manganese, mercury, molybdenum, nickel, niobium, palladium, silver, tantalum, thorium, titanium, tungsten, zirconium. The metallic salts may be used separately or in any combination. Copper 8-quinolinolate has been shown to be particularly effective as a fungus resisting agent, with the other metal chelates also effective.

When the paper is used as a mulch paper, adding small amounts of salts of metals known as trace elements in the agriculture industry, such as cobalt or manganese, provides a convenient and efficient means for compensating for trace element deficiencies in the soil. For example, when preparing mulch paper for use in an area known to be deficient in a certain element, such as cobalt, a small percentage of the copper sulfate, used as in Example 1, is replaced by an equivalent amount of cobalt sulfate. When the mulch paper is disked in and disintegrates at the end of the growing season, the "trace element" remains well distributed in the soil.

Better effects have been obtained by adding the hydroxyquinoline to the furnish before the metallic salt solution is added, rather than adding the metal salt solution before the hydroxyquinoline. This seems to allow the hydroxyquinoline to penetrate the fibers so that the metallic quinolinolate precipitate is formed to a considerable extent inside the fibers. The use of an alkaline solution with the hydroxyquinoline is of advantage in comparison to an acid solution in that the fibers tend to swell with the use of the alkaline solution, but not with the acid solution; this further improves the distribution of the metallic quinolinolate throughout the fibers. Addition of the metal solution before the hydroxyquinoline solution can cause the precipitate to become dispersed in the water rather than to be intimately associated with and throughout the fibrous mass. Good agitation of the slurry after the addition of the hydroxyquinoline compound is important to obtaining proper results. Although kraft and sulfate pulps or fibers have been described in most of the preceding examples, the present invention may be employed with any pulp or fiber commonly used in papermaking.

The papers of this invention provide a more effective degree of fungus resistance and increased life when buried in the soil than do papers made with similar active ingredients applied thereto in the prior art techniques described earlier. The papers are particularly suited for use as mulch paper wherein they are laid over the soil and at least their edges are buried in soil, because they do not disintegrate for extended periods of time on the order of 30 days to over 120 days; this allows the papers to be used as a mulch for the full growing season of the usual agricultural crops. When employed for mulch paper, it is most advantageous that the quantity of the metallic quinolinolate compound in the dried paper be within the range of 0.10 to 3.00 parts by weight for each 100 parts by weight of fibers or pulp (on an ovendry basis) and that the paper have a basis weight of at least 20 pounds per 3,000 sq. ft. The addition of pigment, such as carbon black, to the sheet in order to control its shade or color and thereby control its light transmittance adds an important utilitarian feature. The application of a water resistant coating such as the wax coating described in Examples 18 and 19, the polymer coating described in Example 20, or lamination of the paper to the aluminum foil as in Example 21, yields further useful results. The quantity of the metallic quinolinolate formed in the slurry or furnish from which the paper is made can be controlled so that the field life of the paper can be adjusted to the particular crop with which it is to be used. Other uses for the paper of this invention include paper, paper products, and board which may be subjected to exposure to the elements or to contact with earth, or to burial in soil, particularly in tropical or subtropical climates. These are construction or building papers and boards, including barrier, weatherproof, insulating, sheathing, wall and similar papers, as well as pipe wrap and paper used in air filters. Florist's crepe, parchment, or tissue; crate liners; barrel liners; trunk wrapping; and tree wrap papers also may be produced according to the teachings of this invention. The papers of this invention may find further use, however, for wrapping or packaging applications in which a paper resistant to the growth of mold or fungi is necessary; soap wrapper is a typical illustration of this type, and for such use the papers may have a basis weight of 15 to 100 pounds and a metallic quinolinolate content of 0.05 to 0.30 part by weight for each 100 parts by weight of fibers or pulp (on an ovendry basis). In other packaging and related applications, papers produced according to this invention advantageously can be used for gummed or pressure sensitive tapes; cartons, carton liners, carton sealing, etc.; liner board, corrugating board, and box board; paper for multiwall bags; twisting papers for eventual conversion into rugs, or woven, or knitted bags, such as sandbags, etc.; and casket paper. When permanence and/or durability are desired this invention is particularly suitable for the production of printing, writing, books, record, poster, label, sign, and chart papers, as well as for bristol board and for automobile board or paper.

We claim:
1. A method for the manufacture of fungus-resistant paper containing a metallic quinolinolate as an active ingredient, comprising the steps of
   (1) preparing a pulp slurry from which the paper is to be made,
   (2) adding a solution of a hydroxyquinoline to the slurry,
   (3) adding a solution of a metallic salt to the slurry to precipitate the metallic quinolinolate therein, and then
   (4) forming paper containing the metallic quinolinolate in a fungus-resistant amount from the slurry.

2. A method as defined in claim 1, wherein: the hydroxyquinoline is 8-hydroxyquinoline, 2-hydroxyquinoline, dibromo - 8 - hydroxyquinoline, dichloro - 8 - hydroxyquinoline, a salt of one of the preceding hydroxyquinolines, or a mixture of at least two of the foregoing hydroxyquinolines or salts thereof.

3. A method as defined in claim 2, wherein: the metallic salt is a salt of copper, zinc, aluminum, cobalt, manganese, nickel, iron, or a mixture of at least two of the foregoing.

4. A fungus-resistant paper containing a metallic quinolinolate, as an active ingredient in a fungus-resistant amount, wherein: the metallic quinolinolate is a precipitate formed in the slurry from which the paper was made by adding a solution of a hydroxyquinoline to the slurry, and then adding a solution of a metallic salt to precipitate the metallic quinolinolate in the slurry prior to formation of the paper therefrom.

5. Paper as defined in claim 4 wherein: the metallic quinolinolate is derived from 8-hydroxyquinoline, 2-hydroxyquinoline, dibromo-8-hydroxyquinoline, dichloro-8-hydroxyquinoline, a salt of one of the preceding hydroxyquinolines, or a mixture of at least two of the foregoing hydroxyquinolines or salts thereof.

6. Paper as defined in claim 5 wherein: the metallic quinolinolate is derived from a salt of copper, zinc, aluminum, cobalt, manganese, nickel, iron, or a mixture of at least two of the foregoing.

7. Paper as defined in claims 4, 5 or 6 further including, on at least one surface thereof, a water-resistant wax coating containing a metallic quinolinolate compound or a hydroxyquinoline.

8. Paper as defined in claims 4, 5 or 6 further including, on at least one surface thereof, a coating containing acrylic polymer and aluminum powder.

References Cited
UNITED STATES PATENTS

| | | | |
|---|---|---|---|
| 1,947,451 | 2/1934 | Barber et al. | 162—161 |
| 2,161,654 | 6/1939 | Ellis | 162—161 |
| 2,377,359 | 6/1945 | Musher | 162—160 |
| 2,767,088 | 10/1956 | Crandall | 162—161 |
| 3,033,865 | 5/1962 | Fronmuller et al. | 162—161 X |
| 3,060,079 | 10/1962 | Pattilloch | 162—161 |

S. LEON BASHORE, Primary Examiner

U.S. Cl. X.R.
47—9; 71—1; 162—183